US009048471B2

United States Patent
Yeung et al.

(10) Patent No.: US 9,048,471 B2
(45) Date of Patent: Jun. 2, 2015

(54) GRAPHENE-BASED SELF-HUMIDIFYING MEMBRANE AND SELF-HUMIDIFYING FUEL CELL

(71) Applicant: THE HONG KONG UNIVERSITY OF SCIENCE AND TECHNOLOGY, Kowloon, Hong Kong (CN)

(72) Inventors: King Lun Yeung, Hong Kong (CN); Wei Han, Hong Kong (CN); Ho Yee Timothy Poon, Hong Kong (CN)

(73) Assignee: The Hong Kong University of Science And Technology, Kowloon, Hong Kong (CN)

( * ) Notice: Subject to any disclaimer, the term of this patent is extended or adjusted under 35 U.S.C. 154(b) by 167 days.

(21) Appl. No.: 13/966,972

(22) Filed: Aug. 14, 2013

(65) Prior Publication Data

US 2013/0323613 A1    Dec. 5, 2013

Related U.S. Application Data

(63) Continuation-in-part of application No. 13/435,958, filed on Mar. 30, 2012.

(60) Provisional application No. 61/457,456, filed on Apr. 1, 2011, provisional application No. 61/742,673, filed on Aug. 16, 2012.

(51) Int. Cl.
*H01M 4/02* (2006.01)
*H01M 8/04* (2006.01)
*H01M 8/10* (2006.01)

(52) U.S. Cl.
CPC .......... *H01M 8/04291* (2013.01); *Y02E 60/521* (2013.01); *H01M 8/1023* (2013.01);

(Continued)

(58) Field of Classification Search
CPC ................. H01M 2008/1095; H01M 8/04291; H01M 8/1023; H01M 8/1025; H01M 8/1051; H01M 8/1067; Y02E 60/521
USPC ......... 429/413, 475, 477, 481, 482, 483, 492, 429/493, 494, 532, 535
See application file for complete search history.

(56) References Cited

U.S. PATENT DOCUMENTS

| 5,539,002 A | 7/1996 | Watanabe |
| 6,207,312 B1 | 3/2001 | Wynne et al. |

(Continued)

OTHER PUBLICATIONS

Sossina, Haile, M., et al., "Solid acids as fuel cell electrolytes," Nature, Apr. 2001, pp. 910-914, vol. 410, Macmillan Magazines Ltd.

(Continued)

*Primary Examiner* — Patrick Ryan
*Assistant Examiner* — Ben Lewis
(74) *Attorney, Agent, or Firm* — Nath, Goldberg & Meyer; Jerald L. Meyer; Stanley N. Protigal

(57) ABSTRACT

A self-humidifying fuel cell is made by preparing a porous substrate, coating the substrate with a zeolitic material (or a graphene derivative) and filling the pores with a mixture of graphene derivative and proton-conducting material (or a proton-conducting material). The coating of the substrate includes selecting a zeolitic material, and applying coating on the pore walls and surface of the porous substrate, to form zeolitic material-coated pores. The resulting composite material is used as a self-humidifying proton-conducting membrane in a fuel cell.

19 Claims, 10 Drawing Sheets

(52) U.S. Cl.
CPC .......... *H01M 8/1025* (2013.01); *H01M 8/1051* (2013.01); *H01M 8/1067* (2013.01); *H01M 2008/1095* (2013.01)

(56) References Cited

U.S. PATENT DOCUMENTS

| | | | |
|---|---|---|---|
| 2002/0058172 | A1 | 5/2002 | Datz et al. |
| 2004/0241531 | A1 | 12/2004 | Biegert et al. |
| 2005/0053821 | A1 | 3/2005 | Jang |
| 2005/0214615 | A1 | 9/2005 | Nuber et al. |
| 2005/0221143 | A1 | 10/2005 | Kwon et al. |
| 2006/0003195 | A1 | 1/2006 | Noh |
| 2006/0166069 | A1 | 7/2006 | Min et al. |
| 2007/0092777 | A1 | 4/2007 | Zhamu et al. |
| 2007/0110649 | A1 | 5/2007 | Kusakabe et al. |
| 2009/0000475 | A1* | 1/2009 | Fekety et al. .................. 95/105 |
| 2010/0304204 | A1 | 12/2010 | Routkevitch et al. |

OTHER PUBLICATIONS

Piao, Jinhua, et al., "A novel cesium hydrogen sulfate-zeolite inorganic composite electrolyte membrane for polymer electrolyte membrane fuel cell application," Journal of Power Sources, 2009, pp. 483-487, vol. 193, Elsevier B.V.

Hogarth, Warren, H. J., et al., "Proton conductivity of mesoporous sol-gel zirconium phosphates for fuel cell applicants," Journal of Materials Chemistry, 2005, pp. 754-758, vol. 15, The Royal Society of Chemistry.

Kwak, Sang-Hee, et al., "The effect of platinum loading in the self-humidifying polymer electrolyte membrane on water uptake," Journal of Power Sources, 2003, pp. 200-204, vol. 118, Elsevier Science B.V.

Watanabe, Masahiro, et al., "Analyses of self-humidification and suppression of gas crossover in Pt-dispersed polymer electrolyte membranes for fuel cells," J. Electrochem. Soc., Apr. 1998, vol. 145, No. 4, The Electrochemical Society, Inc.

Wang, C., et al., "Preparation and evaluation of a novel self-humidifying Pt/PFSA composite membrane for PEM fuel cell," Chemical Engineering Journal, 2005, pp. 87-91, vol. 112, Elsevier B.V.

Liu, Fuqiang, et al., "Development of novel self-humidifying composite membranes for fuel cells," Journal of Power Sources, 2003, pp. 81-89, vol. 124, Elsevier B.V.

Yang, B., et al., "Operation of thin Nafion-based self-humidifying membranes in proton exchange membrane fuel cells with dry H2 and O2," Journal of Power Sources, 2005, pp. 170-175, vol. 139, Elsevier B.V.

Zhang, Yu, et al, "A low-cost PTFE-reinforced integral multilayered self-humidifying membrane for PEM fuel cells," Electrochemical and Solid-State Letters, 2006, pp. A332-A335, vol. 9, No. 7, The Electrochemical Society.

Lee, Han-Kyu, et al., "A study on self-humidifying PEMFC using Pt-ZrP-Nafion composite membrane," Electrochimica Acta, 2004, pp. 761-768, vol. 50, Elsevier B.V.

Zhang, Yu, et al, "Promotion of PEM self-humidifying effect by nanometer-sized sulfated zirconia-supported Pt catalyst hybrid with sulfonated poly(ether ether ketone)," J. Phys. Chem. B, 2007, pp. 6391-6399, vol. 111, American Chemical Society.

Wang, L., et al., "Pt/SiO2 catalyst as an addition to Nafion/PTFE self-humidifying composite membrane," Journal of Power Sources, 2006, pp. 61-67, vol. 161, Elsevier B.V.

Hagihara, Hiroki, et al., "Preparation of highly dispersed SiO2 and Pt particles in Nafion 112 for self-humidifying electrolyte membranes in fuel cells," Electrochimica Acta, 2006, pp. 3979-3985, vol. 51, Elsevier B.V.

Wang, Cheng, et al., "Study of novel self-humidifying PEMFC with nano-TiO2-based membrane," Key Eng. Mater. 2005, pp. 280-283, 899, Trans Tech Publications, Switzerland.

Uchida, Hiroyuki, et al., "Self-humidifying electrolyte membranes for fuel cells preparation for highly dispersed TiO2 particles in Nafion 112," Journal of the Electrochemical Society, 2003, pp. A57-A62, vol. 150, No. 1, The Electrochemical Society, Inc.

Zhu, Xiaobing, et al., "An ultrathin self-humidifying membrane for PEM fuel cell application: fabrication, characterization, and experimental analysis," J. Phys. Chem. B, 2006, pp. 14240-14248, vol. 110, American Chemical Society.

Zhang, Wenjing, et al., "Exfoliated Pt-clay/Nafion nanocomposite membrane for self-humidifying polymer electrolyte fuel cells," Langmuir, 2008, pp. 2663-2670, vol. 24, American Chemical Society.

Son, Dong-Hoon, et al., Preparation of Pt/zeolite-Nafion composite membranes for self-humidifying polymer electrolyte fuel cells, Journal of Power Sources, 2007, pp. 733-738, vol. 165, Elsevier B.V.

Yahiro, Hidenori, et al, "Conductivity of zeolite/poly(tetrafluoroethylene) composite membrane in the presence of water vapor," Phys. Chem. Phys., 2003, pp. 620-623, vol. 5, The Owner Societies.

Sancho, T., et al., "Conductivity in zeolite-polymer composite membranes for PEMFCs," Journal of Power Sources, 2007, pp. 92-97, vol. 169, Elsevier B.V.

Carbone, Alessandra, et al., "Investigation on composite S-PEEK/H-BETA MEAs for medium temperature PEFC," International Journal of Hydrogen Energy, 2008, pp. 3153-3158, vol. 33, Elsevier Ltd.

Ahmad, M.I., et al., "Proton conductivity and characterization of novel composite membranes for medium-temperature fuel cells," Desalination, 2006, pp. 387-397, vol. 193, Elsevier B.V.

Shichun, Mu, et al., "A self-humidifying composite membrane with self-assembled Pt nanoparticles for polymer electrolyte membrane fuel cells," Journal of The Electrochemical Society, 2006, pp. A1868-A1872, vol. 153, The Electrochemical Society.

Liu, Yonghao, et al., "Reinforced and self-humidifying composite membrane for fuel cell applications," Journal of Membrane Science, 2009, pp. 357-362, vol. 330, Elsevier B.V.

Zhu, Xiao-Bing, et al., "A novel PTFE-reinforced multilayer self-humidifying composite membrane for PEM fuel cells," Electrochemical and Solid-State Letters, 2006, pp. A49-A52, vol. 9, No. 2, The Electrochemical Society.

Nishimura, Hironobu, et al., "Performance of a pore-filling electrolyte membrane in hydrogen-oxygen PEFC," Electrochemical and Solid-State Letters, 2004, pp. A385-A388, vol. 7, No. 11, The Electrochemical Society, Inc.

Bocchetta, P., "Nanoscale membrane electrode assemblies based on porous anodic alumina for hydrogen-oxygen fuel cell," J. Solid State Electrochem, 2007, pp. 1253-1261, vol. 11, Springer-Verlag.

Au, Louisa, Tak Yin, et al., "Preparation of supported Sil-1, TS-1 and VS-1 membranes effects of Ti and V metal ions on the membrane synthesis and permeation properties," Journal of Membrane Science, 2001, pp. 269-291, vol. 183, Elsevier Science B.V.

* cited by examiner

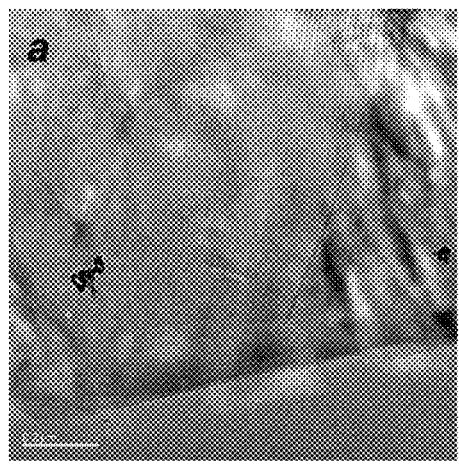
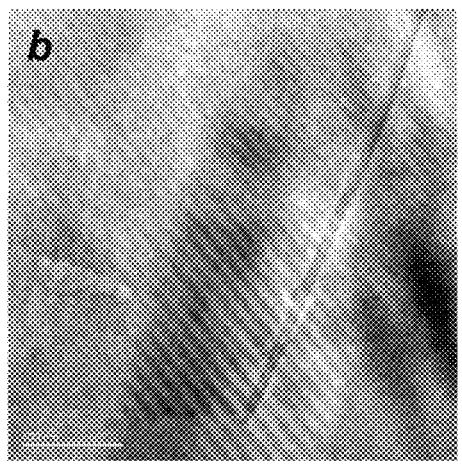
Fig. 5A  Fig. 5B
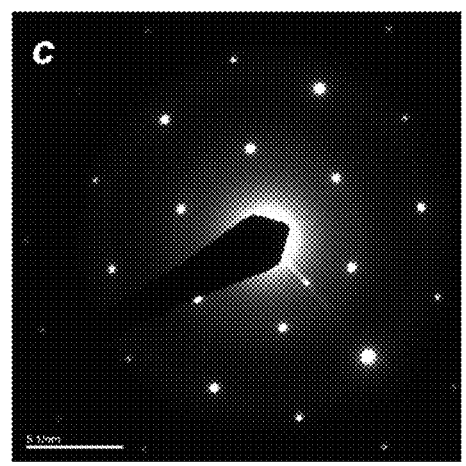
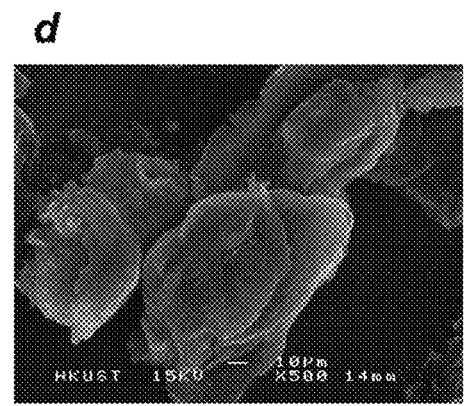
Fig. 5C  Fig. 5D

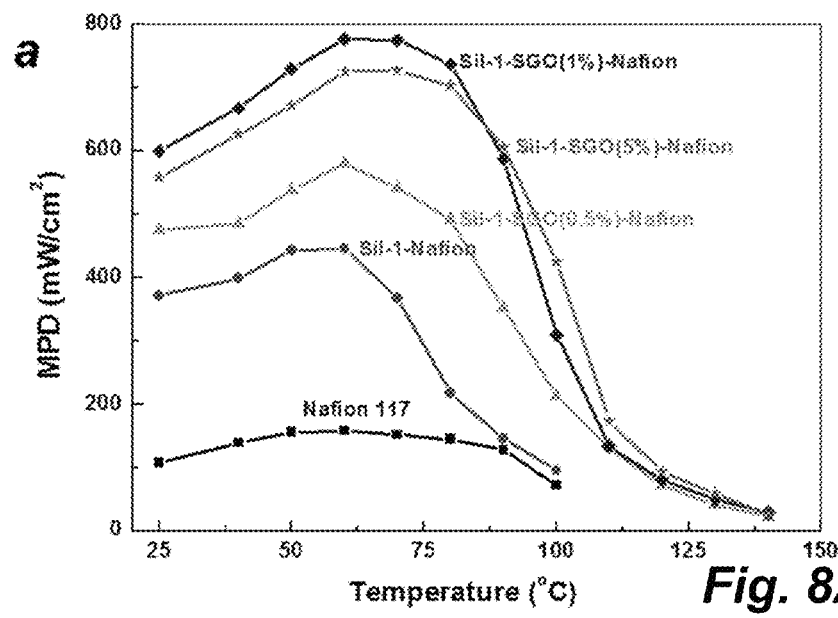
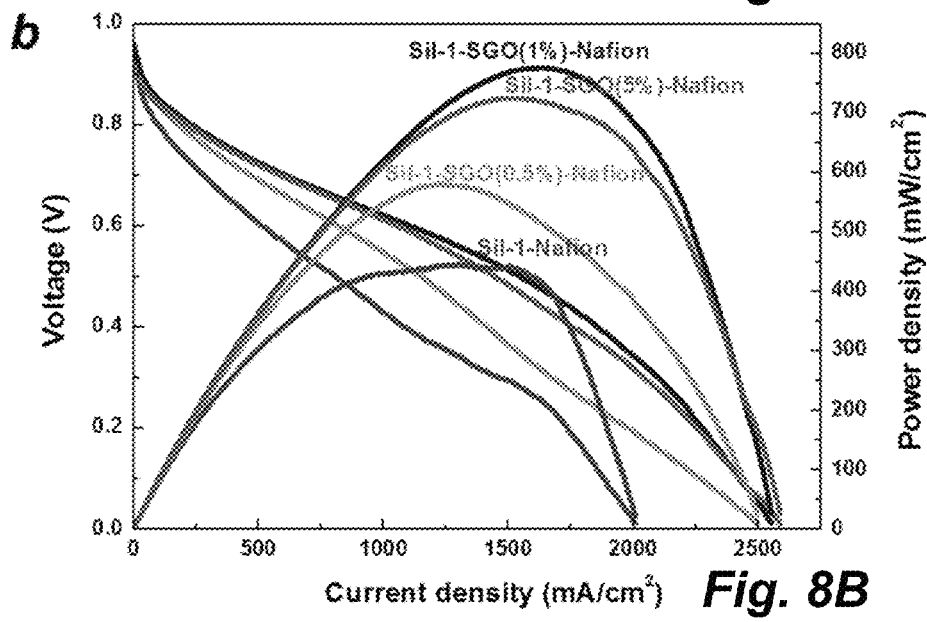
Fig. 8A
Fig. 8B

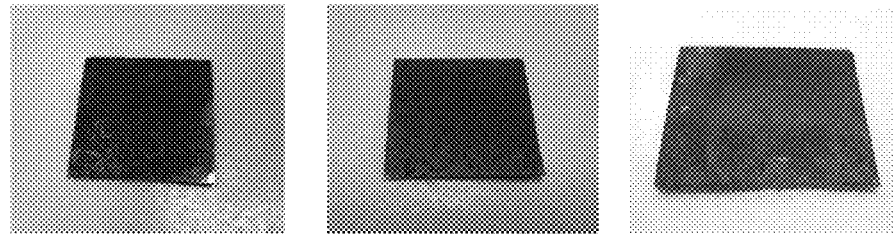
*Fig. 9A*  *Fig. 9B*  *Fig. 9C*
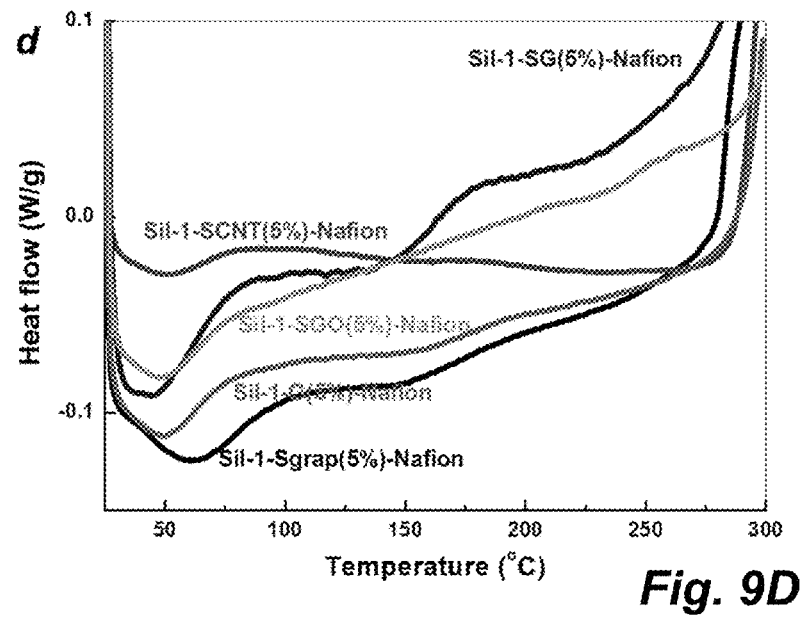
*Fig. 9D*
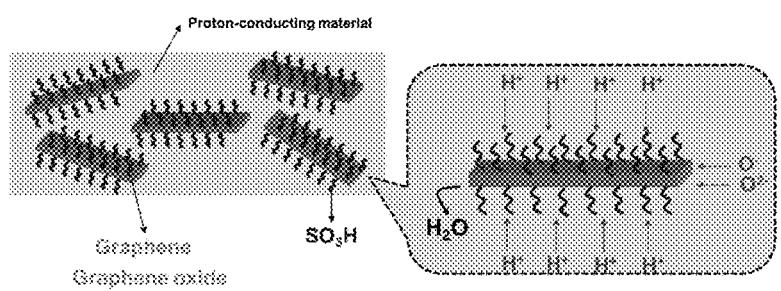
*Fig. 12*

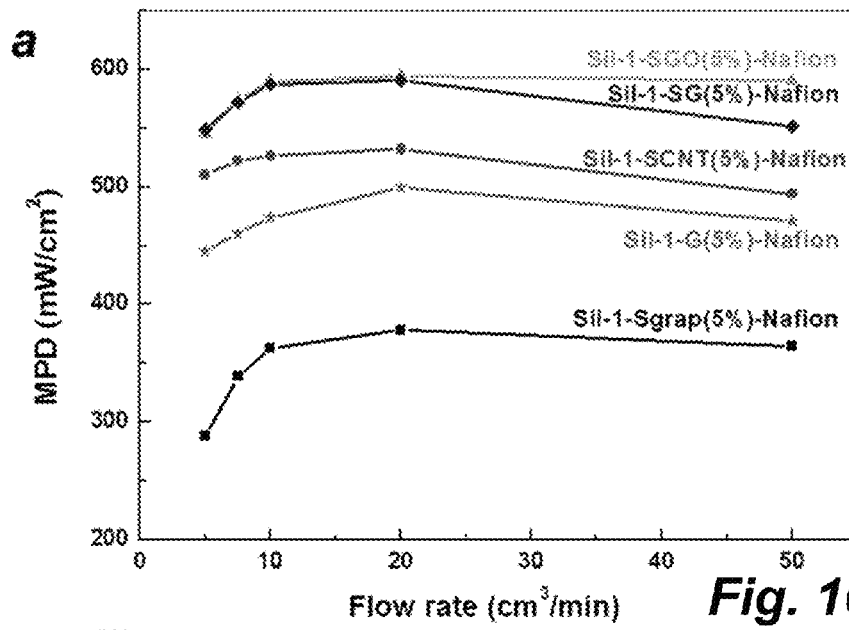
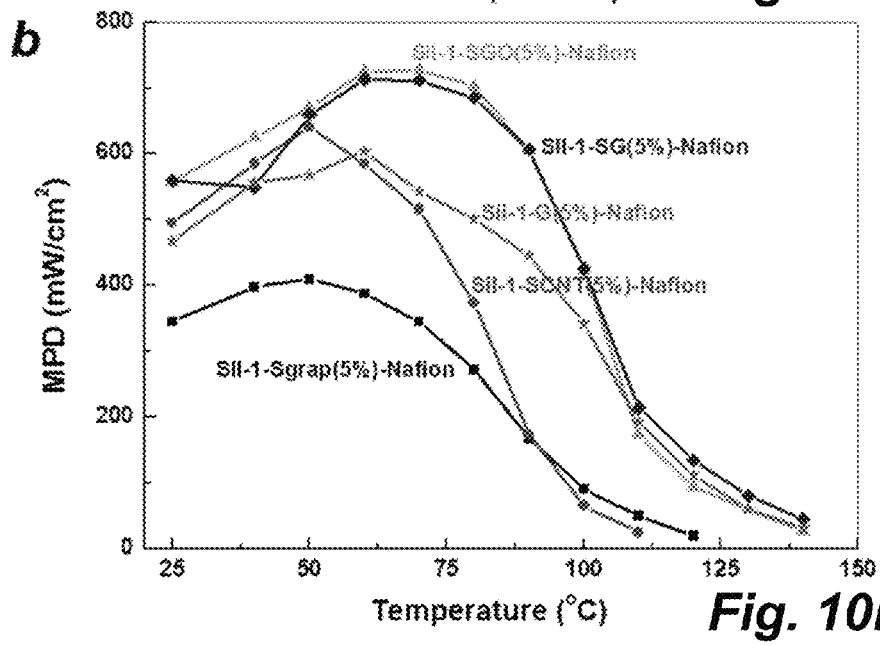

GRAPHENE-BASED SELF-HUMIDIFYING MEMBRANE AND SELF-HUMIDIFYING FUEL CELL

RELATED APPLICATIONS

The present Patent Application is a Continuation in Part of U.S. patent application Ser. No. 13/435,958, filed Mar. 30, 2012, which claims priority to Provisional Patent Application No. 61/457,456 filed Apr. 1, 2011, both of which are assigned to the assignee hereof and filed by the inventors hereof and are incorporated by reference herein. The present Patent Application claims priority to U.S. Provisional Patent Application No. 61/742,673 filed Aug. 16, 2012, which is assigned to the assignee hereof and filed by the inventors hereof and which is incorporated by reference herein.

BACKGROUND

1. Field

The present disclosure relates to self-humidifying Proton Exchange Membrane Fuel Cell (PEMFC) and in particular, to the design, preparation and properties of a graphene-based proton-conducting composite membrane confined in a porous substrate such as a zeolite, zeotype and/or molecular sieve-coated porous substrate.

2. Background

Perfluorosulphonic acid (PFSA) polymers such as Nafion® from DuPont® are the most common polymer electrolyte membranes used in a Proton Exchange Membrane Fuel Cell (PEMFC) due to their high proton conductivity and excellent long-term stability under a fully hydrated condition. (Nafion is a registered trademark of E.I. duPont de Nemours.) PFSA polymers lose mechanical and dimensional stabilities at high temperature due to its low glass transition temperature, which restricts the operating temperature of PEMFC utilizing PFSA to below 80° C. The low operating temperature brings many problems including greater sensitivity to fuel impurities (e.g., CO, $H_2S$) and complicated heat and water management problems. The proton conductivity of PFSA polymers also suffers a sharp drop under low membrane hydration, resulting in poor performance. Therefore, external humidification equipment is often necessary when using PFSA polymers, which complicates the system design and operation, and lowers the overall energy efficiency. Many attempts have been made to achieve operation without humidification, including redesign of the membrane structure, proton conductors designed to operate under low humidity and high temperature, and self-humidifying electrolyte membranes.

SUMMARY (Summary to Paraphrase Broadest Claim)

BRIEF DESCRIPTION OF THE DRAWINGS

FIG. 1A shows the procedure and FIG. 1B shows vacuum drying process applied to a Nafion precursor.

FIG. 4A is a graphical depiction of the micro-Raman spectrum of graphite oxide prepared from flake graphite. FIGS. 4B-4D show XRD patterns of graphite, graphite oxide and graphene oxide.

FIGS. 5A-5D are images taken from GO-1050. FIGS. 5A and 5B are TEM images; FIG. 5C is a selected area electron diffraction (SAED) pattern of GO-1050; and FIG. 5D shows a SEM image.

FIG. 7A depicts MPD vs. flow rate curves of different fuel cells. FIG. 7B shows their I-V and I-P curves.

FIGS. 8A and 8B are graphical depictions showing fuel cell performances using various electrolyte membranes. FIG. 8A shows MPD vs. temperature curves of different fuel cells. FIG. 8B shows their I-V and I-P curves.

FIGS. 9A-9C are photos of confined Sil-1-SGO(5%)-Nafion, Sil-1-SG(5%)-Nafion and Sil-1-G(5%)-Nafion composite membranes. FIG. 9D is a graphical depiction of differential scanning calorimetry characterization for various graphene-based composite membranes.

FIGS. 10A and 10B are graphical depictions showing the effects of flow rate and temperature on MPD. FIG. 10A shows MPD vs. flow rate and FIG. 10B shows MPD vs. temperature curves of the fuel cells with different electrolyte membranes.

FIG. 11A shows I-V and I-P curves of the fuel cell with confined Sil-1-SG (5%)-Nafion composite membrane and FIG. 11B shows I-V and I-P curves of the fuel cell with confined Sil-1-G(5%)-Nafion composite membrane.

FIG. 12 is a schematic diagram of the self-humidifying mechanism of graphene-based composite membrane.

DETAILED DESCRIPTION

Overview

Figure 1A:
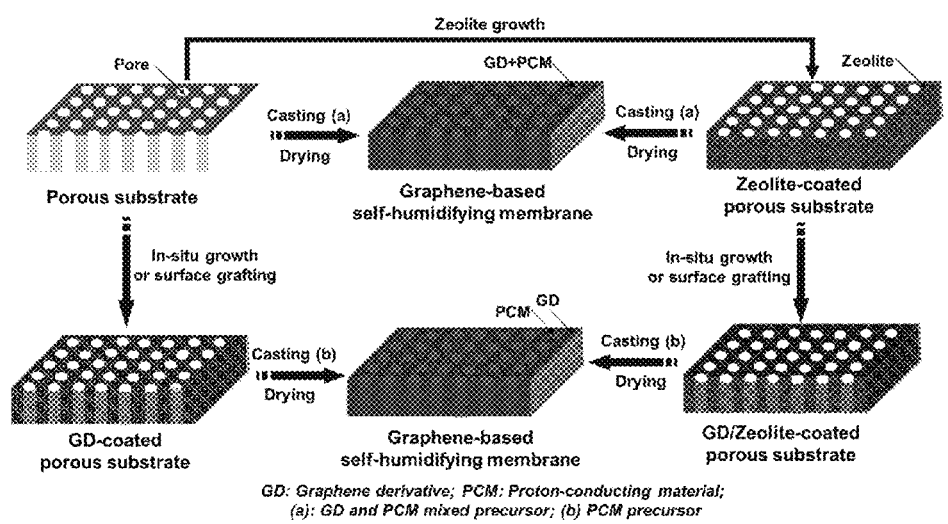
FIGS. 1A and 1B are schematic diagrams of preparation procedures of a graphene-based self-humidifying membrane.
Figure 1B:
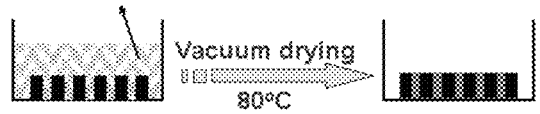
Figure 2A:
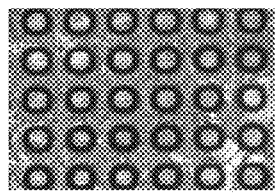
FIGS. 2A-2F are microscopy images of porous stainless steel (2A and 2B), ceramic (2C and 2D) and plastic (2E and 2F) substrates.
Figure 2C:
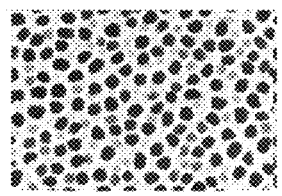
Figure 2E:
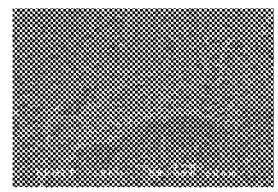
Figure 2B:
Figure 2D:
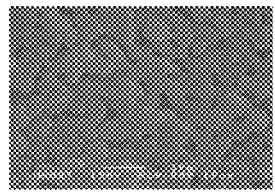
Figure 2F:
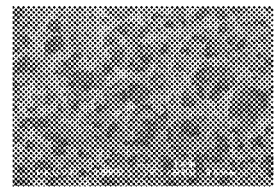

FIGS. 1A and 1B are schematic diagrams of preparation procedures of a graphene-based self-humidifying membrane. FIG. 1A shows the procedure and FIG. 1B shows vacuum drying applied to a Nafion precursor. A graphene-based self-humidifying electrolyte membrane is formed by confining a mixture of graphene derivative and proton-conducting material within a porous substrate or zeolite-coated porous substrate or by confining a proton-conducting material (PCM) within a graphene derivative (GD)-coated or GD/zeolite-coated porous substrate. In an example configuration, zeolite as a thin layer is distributed uniformly and attached firmly on the surface of porous substrate. In another example, a mixture of GD and PCM completely fills the zeolite-coated porous substrate. Confinement and the addition of GD significantly improve thermal stability of the membrane. The existence of GD results in the membrane having a good oxygen reduction function. The oxygen species produced on the GD surface react with proton to generate water, which leads to excellent self-humidifying performance of the graphene-based composite membrane.

In one non-limiting example of a method to produce graphene-based self-humidifying membrane, the preparation includes the following preparation steps, as shown in FIG. 1A:

(1-1) coating zeolite on the surface of a porous substrate;
(2-1) filling the pores of porous substrate or zeolite-coated porous substrate with a mixture of GD and proton-conducting material;
(1-2) coating GD on the surface of porous substrate or zeolite-coated porous substrate;
(2-2) filling the pores of the GD-coated or GD/zeolite-coated porous substrate with a proton-conducting material;
(3) activating the self-humidifying membrane.

"Activating", as used herein, means the process of removing solvents in proton-conducting polymer precursors and porous structures of zeolites, molecular sieves or zeotype materials, in order to make the membrane self-humidifying. The solvents were evaporated via vacuum drying process. The prepared composite membrane has self-humidifying performance due to zeolite confinement and the existence of porous zeolite structures.

The present disclosure also describes a method for assembling a self-humidifying fuel cell. The fuel cell with graphene-based self-humidifying membrane outputs much higher performance than a standard fuel cell with commercial membrane under high temperature and dry conditions.

Manufacture of Graphene Derivative (a) Preparation of Graphite Oxide

Graphite oxide is prepared from flake graphite via a modified Hummers method. In a typical synthesis, 1 g of flake graphite is mixed with 23 ml of 96% $H_2SO_4$ solution and 0.5 g of $NaNO_3$, followed by slowly adding 3 g of $KMnO_4$, in an ice bath to avoid sudden increase of temperature. The mixture is stirred at 35° C. for 30 min. Then 23 ml of double deionized (DDI) water is added slowly to above-mentioned mixture and stirred at 98° C. for 15 min, followed by adding 140 ml of DDI water for further dilution. Upon the dilution, 10 ml of 35 wt % $H_2O_2$ solution is added drop by drop to avoid sudden release of a large amount of $O_2$. The obtained mixture is stirred overnight, followed by washing with DDI water until no sulfate ion is detected. The product is dried in vacuum oven at 80° C. overnight to obtain graphite oxide.

(b) Preparation of Sulfonated Graphene Oxide (SGO)

Graphite oxide can be further converted into graphene oxide (GO) by thermal shocking at high temperature or by ultrasonic treatment. For thermal shocking, graphite oxide is placed into a ceramic crucible, then transferred into an oven at 1050° C. for 30 seconds and cooled down at room temperature in air. For ultrasonic treatment, graphite oxide is dispersed into DDI water at a weight ratio of 1 part graphite oxide to 1000 parts $H_2O$ and sonicated for 1 hour to obtain GO dispersion in water. GO dispersion is mixed with the aqueous solution of $NaBH_4$ and $Na_2CO_3$ under stirring for 1 hour at 80° C. The partially reduced GO is obtained by centrifugation, washing and drying at 80° C. overnight. The partially reduced GO is functionalized by aryl diazonium salt to prepare SGO.

In a typical synthesis, 46 mg of sulfanilic acid is dissolved into 10 ml of 0.625 wt % $Na_2CO_3$ solution, followed by adding 10 g of water containing 18 mg $NaNO_2$. The obtained solution is added slowly into 1.84 ml of 1 mol/l HCl in an ice bath to prepare aryl diazonium salt solution. The partially reduced GO (0.075 g) is dispersed into 75 g of DDI water under ultrasonic treatment, followed by adding 1.53 ml of 1 mol/l NaOH solution and above-mentioned aryl diazonium salt solution. The obtained mixture is stirred in an ice bath for 2 hours. The product is centrifuged, washed and dried at 80° C. overnight to obtain SGO.

(c) Preparation of Sulfonated Graphene (SG)

SGO is dispersed into DDI water at a weight ratio of 1 part SGO to 1000 parts $H_2O$ and sonicated for 1 hour to obtain SGO dispersion in water. SGO aqueous dispersion is mixed with hydrazine solution (ca. 30 wt %) and stirred continuously at 100° C. for 24 hours. Then a few drops of 5 wt % $Na_2CO_3$ solution are added into above-mentioned mixture. The product is centrifuged, washed and dried at 80° C. overnight to obtain SG.

(d) Preparation of Graphene (G)

Graphite oxide is dispersed into DDI water at a weight ratio of 1 part graphite oxide to 1000 parts $H_2O$ and sonicated for 1 hour to obtain GO dispersion in water. GO aqueous dispersion is mixed with hydrazine solution (ca. 30 wt %) and stirred continuously at 100° C. for 24 hours. The product is centrifuged, washed and dried at 80° C. overnight to obtain graphene.

(e) Preparation of Sulfonated Carbon Nanotube (SCNT) and Sulfonated Graphite (Sgrap)

For comparison, SCNT and Sgrap are also prepared via the following method. In a typical synthesis, 1 g of carbon nanotube (or flake graphite) is added slowly into 50 ml of concentrated $H_2SO_4$ heated to 250° C. under nitrogen flow, followed by stirring continuously at 250° C. under nitrogen flow for 18 hours. The suspension is cooled down to room temperature and added into 200 ml of DDI water. The product is filtrated, washed with DDI water until no $SO_4^{2-}$ is detected and dried at 80° C. overnight to obtain SCNT (or Sgrap).

Manufacture of Substrate (a) Porous Substrate

Porous substrates include metals (typically stainless steel), glasses, ceramics and plastics with straight and tortuous pores. Examples include, but are not limited to, (1) metal foams (i.e., nickel and nickel alloy foam), (2) etched porous metals, (3) porous metals, (4) porous carbon/graphite, (5) ceramic foams, (6) porous ceramics, (7) track etched polymers and plastics, (8) porous plastics, (9) sintered glasses. The pore size of such porous substrates as used herein is in the range of 20 nm to 500 μm.

The thickness of the substrate can be in a range of 10 to 1000 μm, with a more narrow range being 50 to 200 μm.

(b) Zeolite-Coated Porous Substrate

Multiple different procedures may be used for the preparation of zeolite-coated porous substrates using any of a direct hydrothermal synthesis method, a seeding and regrowth method, a surface grafting method and a dip-coating method.

A typical zeolite-coated porous substrate is Sil-1-coated stainless steel mesh (SSM). SSM is prepared via a photochemical-etching method. In a typical fabrication of Sil-1-coated SSM, a seeding and regrowth method is involved. SSM with the size of 2.5 cm×2.5 cm is sequentially dipped into 1 vol % 3-mercaptopropyl trimethoxysilane solution in ethanol for 15 min. and 1.6 wt % TPA-Sil-1 nanoparticle suspension in DDI water for 30 seconds, followed by drying at 100° C. for 15 min. The processes of dipping into suspension and drying are repeated for 2 times to obtain seeded SSM. Sil-1 coating is grown on seeded SSM via hydrothermal process. Sil-1 synthesis solution is prepared via adding drop by drop 3.4 ml of tetraethyl orthosilicate into the mixture of 1.9 ml of 1 mol/l tetrapropylammonium hydroxide aqueous solution and 68.5 ml of DDI water, followed by stirring at room temperature for 24 hours. Seeded SSM is positioned vertically in a Teflon holder. Sil-1 synthesis solution and the holder with seeded SSM are transferred into Teflon-lined stainless steel autoclave and hydrothermal-treated at 130° C. for 48 hours to grow Sil-1 coating on SSM.

The zeolitic material can be selected from of at least one of LTA, MFI, FAU zeolite, molecular sieve including the family of mesoporous silica and extra-large pore molecular sieve and zeotype. The zeolitic material can have a thickness in the range of 0.1 to 100 μm. The zeolitic material can have a particle size of below one 1 μm.

(c) GD-Coated Porous Substrate

A GD layer is coated on the surface of porous substrate via surface grafting or in-situ growth methods. For a surface grafting method, GD prepared in above-mentioned steps is dispersed into DDI water via ultrasonic-treatment. The porous substrate is sequentially dipped into 1 vol % 3-mercaptopropyl trimethoxysilane in ethanol for 15 min. and GD aqueous dispersion for 30 seconds before drying at 100° C. for 15 min. The processes of dipping into GD dispersion and drying are repeated at least twice. Graphene is also in-situ grown on porous metal (typically nickel or copper) substrate or another porous substrate with a thin metal (typically nickel or copper) film by chemical vapor deposition using methane and hydrogen at high temperature.

(d) GD/Zeolite-Coated Porous Substrate

A GD/Zeolite-coated porous substrate is prepared by coating GD layer on the surface of zeolite-coated porous substrate via surface grafting or in-situ growth methods described in Step Substrate (c).

Manufacture of Membrane (a) Confined GD(x %)-PFSA Composite Membrane

A proton-conducting material is confined within a porous substrate. Examples are shown as PFSA, which is a common proton-conducting material used in PEMFC. A PFSA precursor is prepared by mixing 5 wt % PFSA resin suspension in water and solvents with 1:1 to 1:10 volume ratios. This is followed by adding GD with x % (typically 0.1%-20%) weight ratio of GD to PFSA and ultrasonic-treatment for 1 hour to obtain GD and PFSA mixed precursor. The porous substrate is then impregnated with GD and PFSA mixed precursor, vacuum dried at 80° C. to remove solvents. The procedure is repeated until the pores are filled to obtain confined GD(x %)-PFSA composite membrane.

The solvents used in the PFSA precursor are, by way of non-limiting example, selected from isopropanol, dimethyl sulfoxide, ethylene glycol, 1,2-propanediol and glycerol.

(b) Confined Zeolite-GD(x %)-PFSA Composite Membrane

A confined Zeolite-GD(x %)-PFSA composite membrane is prepared by filling GD and PFSA into the pores of zeolite-coated porous substrate according to similar procedure described in Step Membrane (a).

(c) Confined GD-PFSA Composite Membrane

The PFSA precursor is prepared by mixing 5 wt % PFSA resin suspension in water and solvents with 1:1 to 1:10 volume ratios. The GD-coated porous substrate prepared via surface grafting or in-situ growth is impregnated with PFSA precursor, and vacuum dried at 80° C. to remove solvents as depicted in FIG. 1B. The procedure is repeated until the pores are filled to obtain confined GD-PFSA composite membrane.

(d) Confined GD/Zeolite-PFSA Composite Membrane

Confined GD/Zeolite-PFSA composite membrane is prepared by filling PFSA into pores of GD/zeolite-coated porous substrate according to similar procedure described in Step Membrane (c).

Graphene-based self-humidifying membranes containing other proton-conducting materials such as sulfonated polyetherketone and sulfonated chitosan are prepared from corresponding precursor according to similar procedures described above in the description of manufacture of membrane, Steps (a-d). A sulfonated polyetherketone precursor is prepared by dissolving sulfonated polyetherketone into dimethyl sulfoxide. A chitosan precursor is prepared by dissolving chitosan into 2 wt % acetic acid solution at 80° C. For the chitosan precursor, solvent removal process is carried out by vacuum drying at 25° C. The prepared graphene-based self-humidifying membrane containing chitosan is immersed in 2 mol/l $H_2SO_4$ solution for 24 hours to allow chitosan cross-linking, followed by washing with DDI water and vacuum drying at 25° C. to obtain graphene-based self-humidifying membrane containing sulfonated chitosan.

The proton-conducting material can include materials selected from perfluorosulphonic acid polymer, sulfonated polyetherketone and sulfonated chitosan.

Characterization (a) Micro-Raman Spectroscopy

Graphite and graphite oxide are placed on a glass slide. Their micro-Raman spectra are measured using a Renishaw RM3000 micro-Raman/photoluminescence system with an Olympus BH-2 microscope. The excitation source is an argon laser operating at 514.5 nm with an output power of 20 mW. The Raman signals between 100 and 3200 $cm^{-1}$ are collected with the resolution of 1.0 $cm^{-1}$.

(b) X-ray Diffraction (XRD)

XRD is used to verify the crystallographic structures of graphite and graphene derivatives. XRD patterns of graphite and graphene derivatives are collected with a PAnalytical X'pert Pro X-ray diffractometer with Cu Kα radiation under the step size of 0.05°.

(c) Scanning Electron Microscope (SEM) and Transmission Electron Microscope (TEM)

SEM images and energy dispersive X-ray (EDX) spectra of porous substrates, zeolite-coated porous substrates and graphene derivatives are made using JEOL JSM-6300F and JSM-6390 scanning electron microscopes equipped with EDX detectors. TEM images and selected area electron diffraction (SAED) patterns of graphene derivatives are made using JEOL JEM-2010F transmission electron microscope.

(d) Differential Scanning Calorimetry (DSC)

DSC curves of casted Nafion and composite membranes in compressed air from room temperature to 300° C. (elevation rate: 5° C./min) are measured using a TA Q1000 differential scanning calorimeter. The samples are pre-dipped into DDI water overnight. Before measurement, the samples are wiped with weighing paper to remove water drops on surface and cut into small pieces with the size of 2 mm×2 mm.

Fuel Cell (a) Membrane-Electrode Assembly (MEA)

Porous stainless steel plates coated with gold layers are used as current collectors and gas diffusion layers. The plates are brushed with the slurry containing 20% Pt on Vulcan XC-72 and 10% Nafion resin suspension, followed by drying at 80° C. for 1 hour to obtain electrodes with Pt loading content of 0.5 mg/cm$^2$. A graphene-based self-humidifying membrane is hot-pressed between two pieces of porous stainless steels with Pt/C catalyst layers at 130° C. under 10 MPa pressure for 3 min. to prepare MEA.

(b) Performance Testing

MEA performance is tested by use of home-made testing equipment. Dry UHP-grade hydrogen and oxygen with the same flow rate are supplied to anode and cathode of MEA through special-designed tubes, respectively. The fuel cell is first stabilized under open circuit condition at room temperature overnight, followed by testing its I-V curve under different flow rate at room temperature. Then the operating temperature of the fuel cell is elevated slowly to certain points to test its performances. The fuel cell is stabilized for at least 1 hour at every temperature point. Open circuit voltage (OCV) vs. time and I-V curves of MEA is recorded using a CHI 660C electrochemical station with CHI 680 Amp Booster.

Results

The graphene-based self-humidifying membrane has the structure of graphene derivative and proton-conducting material confined within a porous substrate. The porous substrate can be stainless steel, ceramics and plastics with straight or tortuous pores. FIGS. 2A-2F are microscopy images of porous stainless steel (2A and 2B), ceramic (2C and 2D) and plastic (2E and 2F) substrates. Porous substrates can be coated with a thin layer of zeolite material.

Figures 3A, 3B:
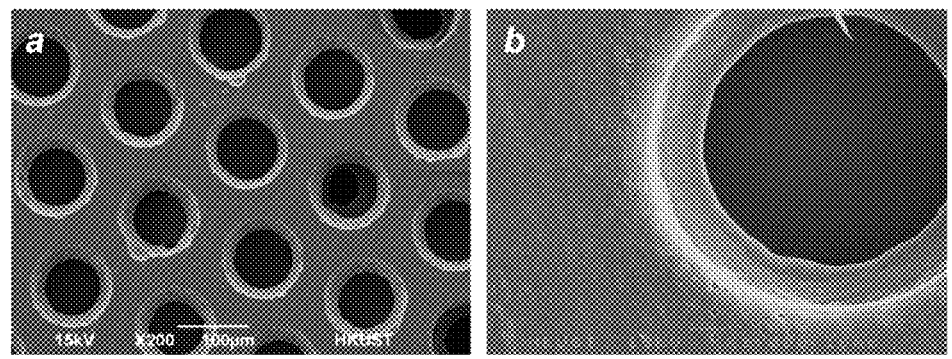
FIGS. 3A and 3B are SEM images of a stainless steel mesh (SSM) substrate and a Sil-1-coated SSM substrate.

FIGS. 3A and 3B are SEM images of stainless steel mesh (SSM) and Sil-1-coated SSM substrates. FIG. 3B shows that uniform and well-intergrown Sil-1 layer can be prepared on a micro-fabricated SSM with hourglass-type pores.

Figure 4A:
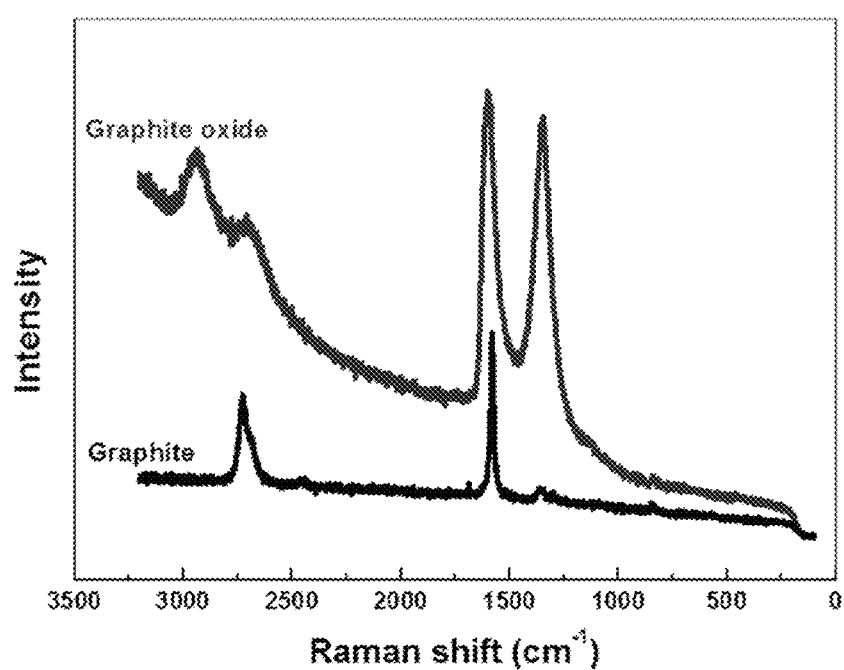
FIGS. 4A-4D are graphic depictions of characterizations for various carbon structures.
Figure 4B:
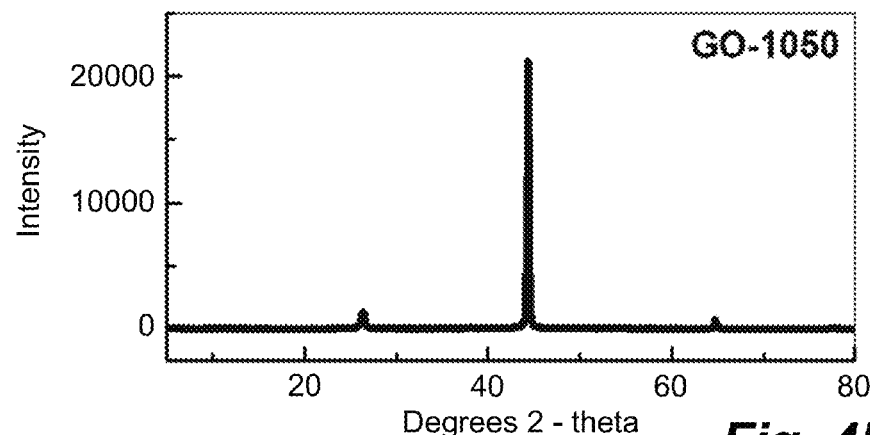
Figure 4C:
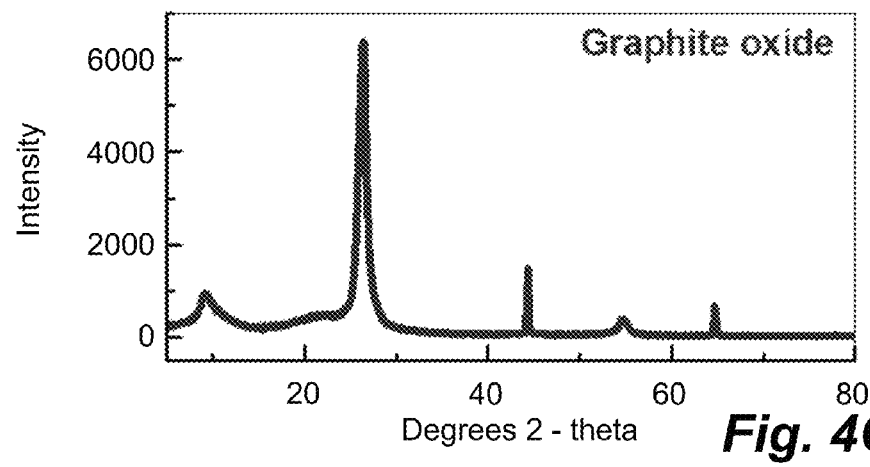
Figure 4D:
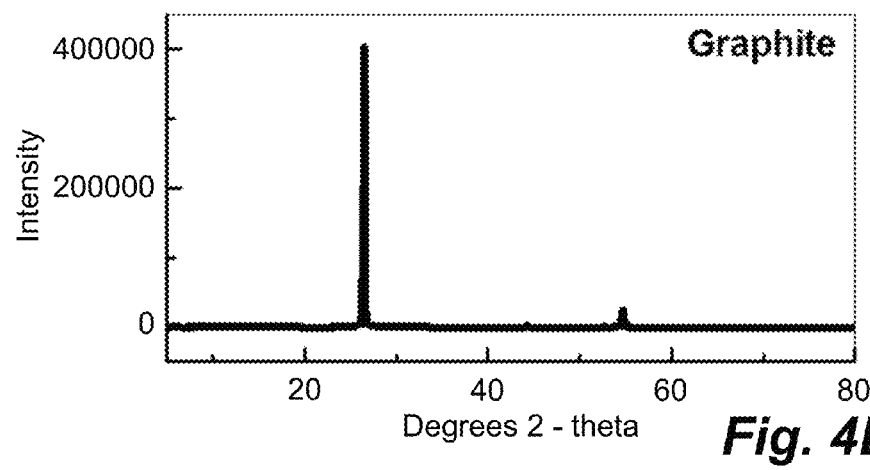

FIGS. 4A-4D are graphic depictions of micro-Raman spectroscopy and X-ray diffraction (XRD) characterizations for various carbon structures. FIG. 4A is a graphical depiction of the micro-Raman spectrum of graphite oxide prepared from flake graphite via modified Hummers method. This sample exhibits a strong D band at 1352 cm$^{-1}$ which is associated with the defects in graphene structure compared to that of flake graphite. FIGS. 4B-4D show XRD patterns of graphite, graphite oxide and graphene oxide prepared by thermal-shocking graphite oxide at 1050° C. (GO-1050). In FIG. 4B, the XRD peak position of flake graphite is 26.5° corresponds to d-spacing of 0.34 nm. FIG. 4C shows another typical XRD peak locating at 9.4° (d-spacing: 0.94 nm) appears in the XRD pattern of graphite oxide, which indicates the existence of exfoliated graphite oxide sheets. The XRD peak locating at ca. 26.5° decreases by a significant amount in the XRD pattern of GO-1050 compared to those of graphite and graphite oxide, which indicates the disappearance of stacked graphite structure within GO-1050, shown in FIGS. 4B-4D.

FIGS. 5A-5D are images taken from GO-1050. FIGS. 5A and 5B are TEM images; FIG. 5C is a selected area electron diffraction (SAED) pattern of GO-1050; and FIG. 5D shows a SEM image of GO-1050. The multi-layered structure of the GO-1050 can be observed clearly from its TEM image shown in FIG. 5A. High-resolution TEM image and SAED pattern shown in FIGS. 5B and 5C verify the existence of single-layer graphene oxide within GO-1050. FIG. 5D shows that GO-1050 has the morphology of micrometer-sized particles with folded layer structures.

Figure 6A:
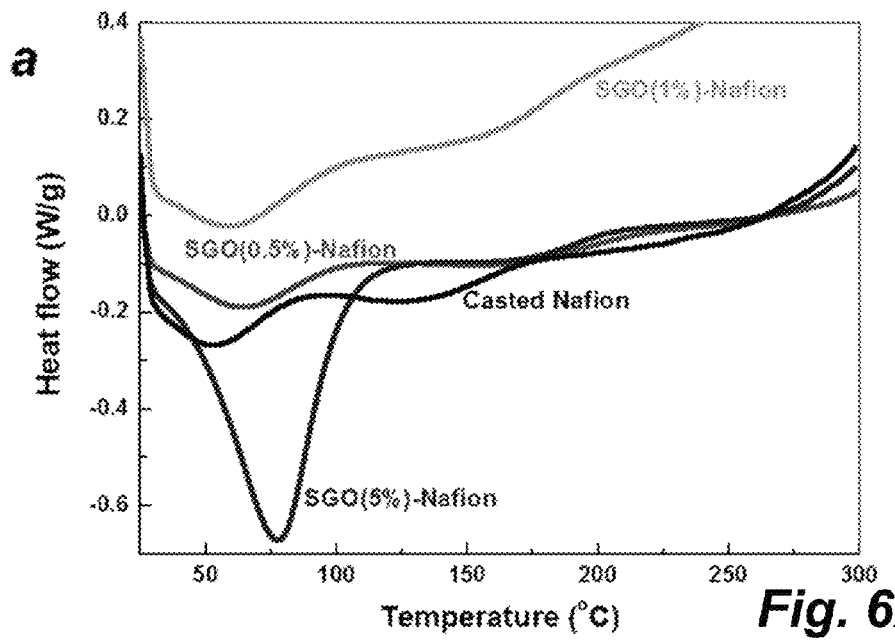
FIGS. 6A and 6B are graphical representations of differential scanning calorimetry characterization for casted Nafion membrane and various graphene-based composite membranes.
Figure 6B:
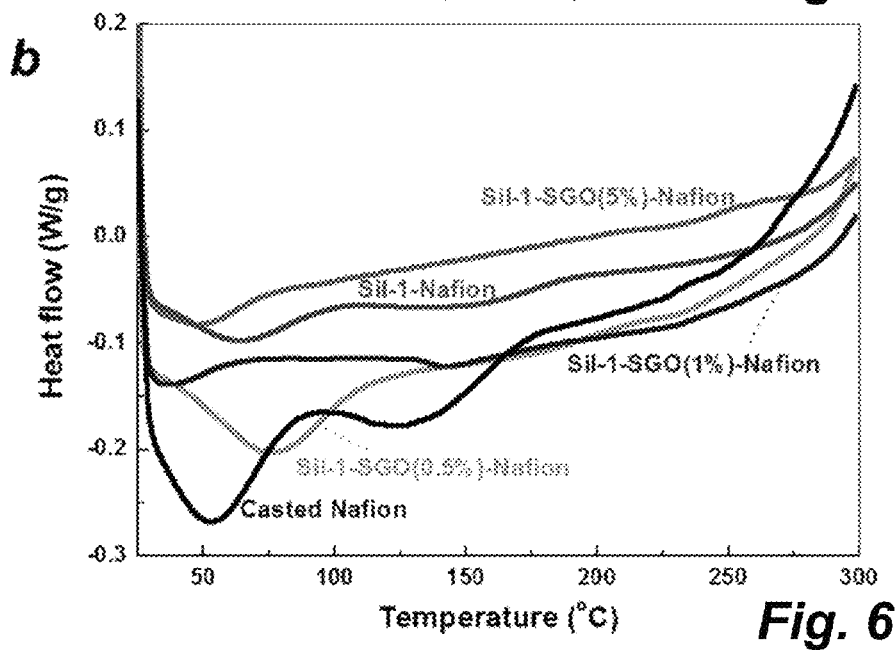

FIGS. 6A and 6B are graphical representations of differential scanning calorimetry characterization for casted Nafion membrane and various graphene-based composite membranes. From DSC curves of casted Nafion and SGO(x %)-Nafion composite membranes shown in FIG. 6A, the addition of SGO clearly increases the glass transition temperature of membrane from 125° C. for casted Nafion to 164° C. for SGO(1%)-Nafion composite membrane, 175° C. for SGO(0.5%)-Nafion and SGO(5%)-Nafion composite membranes. FIG. 6B shows that confined Sil-1-Nafion composite membrane has higher glass transition temperature than casted Nafion (154° C. vs. 125° C.), which indicates that zeolite confinement also improves the thermal stability of composite membrane by limiting shrinkage and swelling of the material caused by temperature changes and thermal effects. Similarly, confined Sil-1-SGO(x %)-Nafion composite membranes have better thermal stabilities than confined Sil-1-Nafion composite membrane due to the addition of SGO from their DSC curves. The glass transition temperatures for confined Sil-1-SGO(0.5%)-Nafion and Sil-1-SGO(1%)-Nafion composite membranes are 175° C. and 150° C., respectively.

Figure 7A:
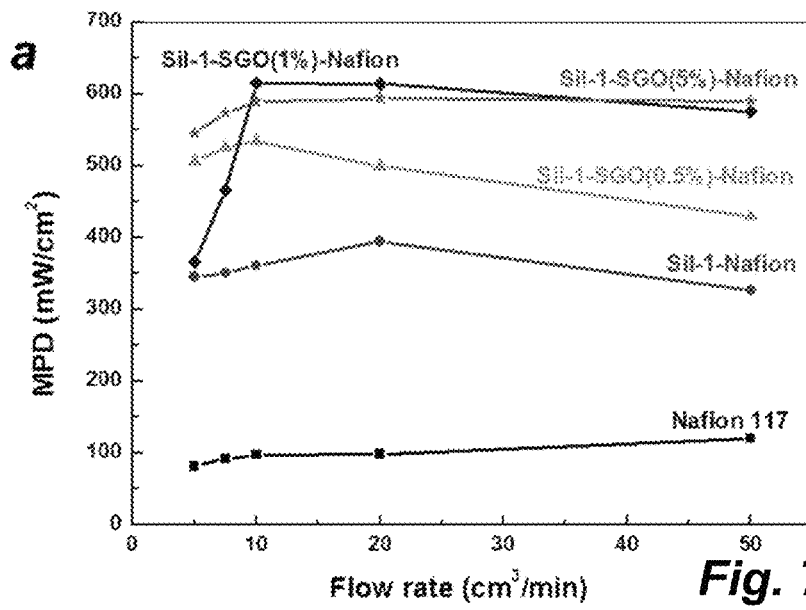
FIGS. 7A and 7B are graphical depictions showing fuel cell performances using various electrolyte membranes.
Figure 7B:
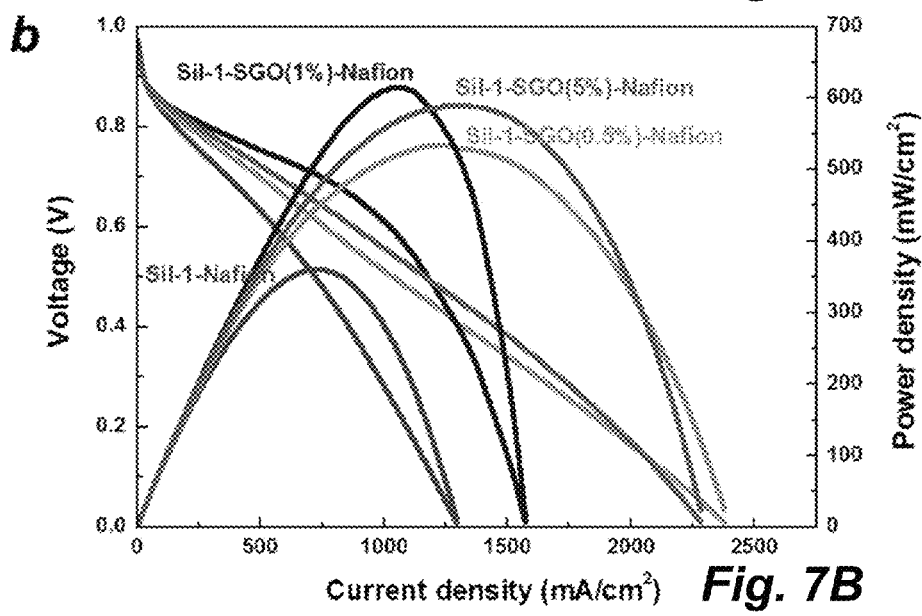

FIGS. 7A and 7B are graphical depictions showing fuel cell performances using various electrolyte membranes. FIG. 7A depicts MPD vs. flow rate curves of the fuel cells with confined Sil-1-SGO(x %)-Nafion, Sil-1-Nafion composite membranes and commercial Nafion-117 membrane. FIG. 7B shows their I-V and I-P curves under 10 cm$^3$/min flow rate at room temperature without humidification. From FIG. 7A, it can be seen that all of the represented fuel cells output increased maximum power densities (MPD) with the increase of hydrogen and oxygen flow rates from 5 cm$^3$/min to 10 cm$^3$/min. With the further increase of flow rate, MPDs of most fuel cells keep constant or decrease slightly. The fuel cells with confined Sil-1-SGO(x %)-Nafion composite membranes output ca. 50% to above 5 times higher MPDs than the fuel cells with confined Sil-1-Nafion composite membrane and commercial Nafion 117 membrane under 10 cm$^3$/min flow rate under room temperature and dry conditions (FIGS. 7A and 7B). Similarly, the fuel cells with confined Sil-1-SGO(x %)-Nafion composite membranes present much higher performances and greater tolerance to high-temperature operation up to 150° C. under dry condition.

FIGS. 8A and 8B are graphical depictions showing fuel cell performances using various electrolyte membranes. FIG. 8A shows MPD vs. temperature curves of the fuel cells with confined Sil-1-SGO(x %)-Nafion, Sil-1-Nafion composite membranes and commercial Nafion 117 membrane. FIG. 8B shows their I-V and I-P curves under 10 cm$^3$/min flow rate at 60° C. without humidification. As shown in FIGS. 8A and 8B, confined Sil-1-SGO(x %)-Nafion composite membranes have excellent thermal stabilities.

FIGS. 9A-9C are photos of confined Sil-1-SGO(5%)-Nafion, Sil-1-SG(5%)-Nafion and Sil-1-G(5%)-Nafion composite membranes. FIG. 9D is a graphical depiction of differential scanning calorimetry characterization for various graphene-based composite membranes The graphs in FIGS. 9A-9C show that confined Sil-1-SGO(5%)-Nafion, Sil-1-SG(5%)-Nafion and Sil-1-G(5%)-Nafion composite membranes have uniform black colors, which indicates that phase separation between graphene derivative and Nafion did not appear during membrane fabrication. That is, graphene derivative has a good compatibility with Nafion matrix. From DSC curves shown in FIG. 9D, the glass transition temperature increases gradually in the sequence of confined Sil-1-Sgrap(5%)-Nafion, Sil-1-G(5%)-Nafion, Sil-1-SG(5%)-Nafion and Sil-1-SGO(5%)-Nafion composite membranes, which is similar with that of MPD outputted by corresponding fuel cells, as shown in FIGS. 10A and 10B. FIG. 10A shows MPD vs. flow rate and FIG. 10B shows MPD vs. temperature curves of the fuel cells with confined Sil-1-GD(5%)-Nafion, Sil-1-SCNT(5%)-Nafion and Sil-1-Sgrap(5%)-Nafion composite membranes without humidification. Though the fuel cell with confined Sil-1-SCNT(5%)-Nafion composite membrane presents comparable performances with the fuel cell with confined Sil-1-G(5%)-Nafion composite membrane at moderate temperature, the fuel cells with confined Sil-1-GD(5%)-Nafion composite membranes output clearly improved performances above 80° C. These results indicate unique self-humidifying mechanism of graphene-based composite membrane which is not only related to sulfonic acid group.

Figure 11A:
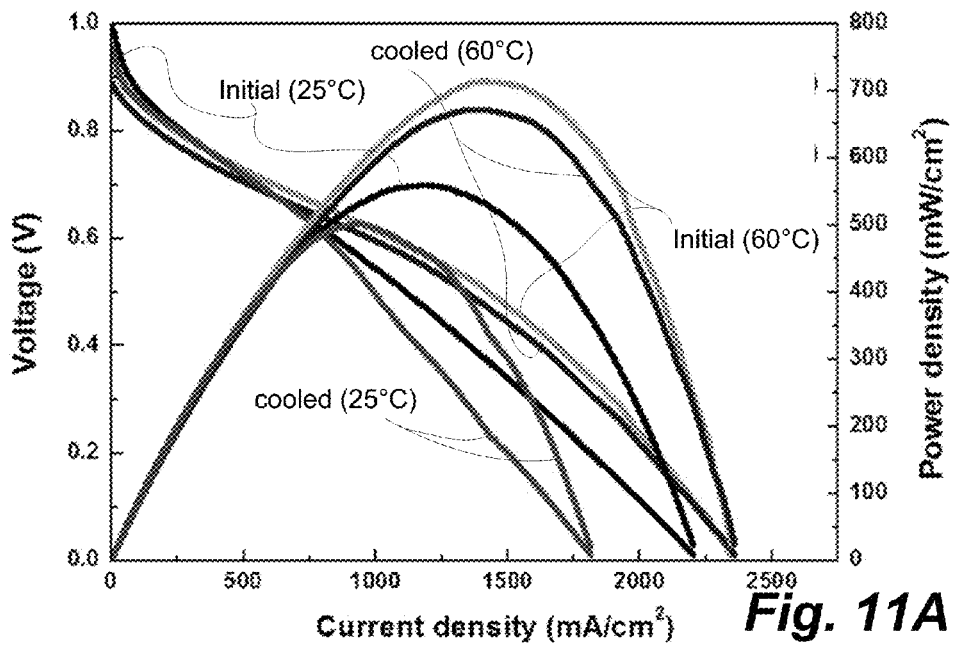
FIGS. 11A and 11B are graphical depictions showing the performances of initial and cooled fuel cells.
Figure 11B:
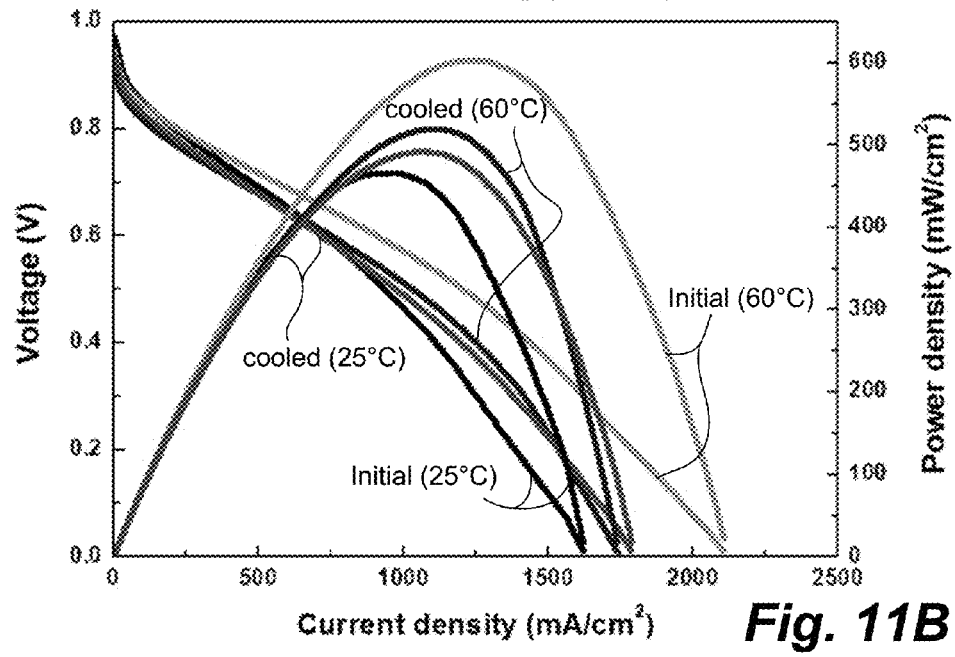

FIGS. 11A and 11B are graphical depictions showing the performances of initial and cooled fuel cells. FIG. 11A and FIG. 11B show I-V and I-P curves of initial and cooled fuel cells with confined Sil-1-SG(5%)-Nafion and Sil-1-G(5%)-Nafion composite membranes under 10 cm$^3$/min flow rate without humidification. For confined Sil-1-SG(5%)-Nafion composite membrane, cooled fuel cell can resume 90% and 94% of initial performances at 25° C. and 60° C., respectively. Cooled fuel cell with confined Sil-1-G(5%)-Nafion composite membrane can resume 105% and 86% of initial performances at 25° C. and 60° C., respectively. These results verify further that graphene-based self-humidifying membrane has a good thermal stability.

FIG. 12 is a schematic diagram of the self-humidifying mechanism of graphene-based composite membrane. The existence of graphene derivative makes composite membrane have a good oxygen reduction activity. Protons transporting through sulfonic acid group or proton-conducting material react with oxygen species on the surface of graphene derivative to generate water, thus keeping membrane humid under high temperature and dry conditions.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method of producing a self-humidifying membrane used in a self-humidifying fuel cell, the method comprising the following steps:

(a) preparing a porous substrate;
    (b-1) coating the porous substrate with a zeolitic material selected from the group consisting of zeolites, molecular sieves and zeotypes to form zeolitic material-coated pore walls and surface; and
    (c-1) filling the pores of the coated porous substrate with a mixture of graphene derivative (GD) and proton-conducting material;
    (b-2) coating GD on the surface of porous substrate or zeolitic material-coated porous substrate;
    (c-2) filling the pores of the GD-coated or GD/zeolitic material-coated porous substrate with a proton-conducting material; and
    (d) activating the self-humidifying membrane by removing solvents in proton-conducting material precursors and porous structures of zeolites, molecular sieves or zeotype materials, thereby imparting a self-humidifying property to the membrane.

2. The method of claim 1, wherein the proton-conducting material for filling the zeolitic material-coated pores comprises a proton-conducting polymer.

3. The method according to claim 1, wherein a porous substrate comprises straight or tortuous pore channels on a flat metal, ceramic, plastic, carbon or glass substrate.

4. The method according to claim 3, further comprising forming the porous substrate with a thickness in the range of 10 to 1000 μm.

5. The method according to claim 3, further comprising forming the porous substrate with a thickness in the range of 50 to 200 μm.

6. The method according to claim 1, wherein said zeolitic material consists of at least one of the group selected from LTA, MFI, FAU zeolite, zeotype, and molecular sieve wherein the molecular sieve is selected from the group consisting of mesoporous silica and extra-large pore molecular sieve.

7. The method according to claim 1, comprising forming the zeolitic material as a layer having a thickness in the range of 0.1 to 100 μm.

8. The method according to claim 1, wherein the proton-conducting material is selected from the group consisting of perfluorosulphonic acid polymer, sulfonated polyetherketone and sulfonated chitosan.

9. The method according to claim 1, comprising using a particle size of zeolitic material particles at or below one micrometer (1 μm).

10. The method of claim 1, wherein the activating comprises removing solvents in the proton-conducting material precursors and porous structures of the zeolites, molecular sieves or zeotype materials to make the membrane self-humidifying.

11. A method of producing a self-humidifying fuel cell, comprising:

using the resulting self-humidifying membrane produced by the method of claim 1 as self-humidifying proton-conducting membrane in the fuel cell.

12. A self-humidifying fuel cell, comprising a self-humidifying membrane produced by the method of claim 1, further comprising:

an anode gas diffusion layer and a catalytic layer adjacent the anode gas diffusion layer; and
    a cathode gas diffusion layer and a catalytic layer close to the cathode gas diffusion layer.

13. A self-humidifying membrane used in a self-humidifying fuel cell, which comprises:

a porous substrate with a zeolitic material coating on a surface of the porous substrate;

a graphene derivative (GD) coating on the zeolitic material-coated porous substrate; and
a proton-conducting material filled into the coated porous substrate.

14. A method of producing a self-humidifying membrane used in a self-humidifying fuel cell, the method comprising:
preparing a porous substrate;
coating the porous substrate with a zeolitic material selected from the group consisting of zeolites, molecular sieves and zeotypes to form zeolitic material-coated pore walls and surface; and
filling the pores of the coated porous substrate with a mixture of graphene derivative (GD) and proton-conducting material;
coating GD on the surface of porous substrate or zeolitic material-coated porous substrate;
filling the pores of the GD-coated or GD/zeolitic material-coated porous substrate with a proton-conducting material; and
activating the self-humidifying membrane by removing solvents in proton-conducting material precursors and porous structures of zeolites, molecular sieves or zeotype materials, thereby imparting a self-humidifying property to the membrane.

15. The method of claim 14, wherein the proton-conducting material for filling the zeolitic material-coated pores comprises a proton-conducting polymer.

16. The method according to claim 14, wherein a porous substrate comprises straight or tortuous pore channels on a flat metal, ceramic, plastic, carbon or glass substrate.

17. The method according to claim 14, wherein said zeolitic material consists of at least one of the group selected from LTA, MFI, FAU zeolite, zeotype, and molecular sieve wherein the molecular sieve is selected from the group consisting of mesoporous silica and extra-large pore molecular sieve.

18. The method according to claim 14, wherein the proton-conducting material is selected from the group consisting of perfluorosulphonic acid polymer, sulfonated polyetherketone and sulfonated chitosan.

19. The method of claim 14, wherein the activating comprises removing solvents in the proton-conducting material precursors and porous structures of the zeolites, molecular sieves or zeotype materials to make the membrane self-humidifying.

* * * * *